United States Patent

Hogan et al.

[11] Patent Number: 6,102,608
[45] Date of Patent: Aug. 15, 2000

[54] DAMAGE RESISTANT CONTROL KNOB/SHAFT ASSEMBLY

[75] Inventors: Michael Patrick Hogan; Hamid Ali Khan, both of Carmel; Darl Thomas Dufendach, Kokomo, all of Ind.

[73] Assignee: Delco Electronics Corp., Kokomo, Ind.

[21] Appl. No.: 09/066,796

[22] Filed: Apr. 27, 1998

[51] Int. Cl.[7] ........................................ F16C 3/03
[52] U.S. Cl. ........................ 403/300; 403/305; 403/377
[58] Field of Search ................................ 403/300, 301, 403/302, 305, 310, 311, 286, 377, 379.5; 74/493

[56] References Cited

U.S. PATENT DOCUMENTS

| | | | |
|---|---|---|---|
| 2,252,855 | 8/1941 | Lasch | 403/377 X |
| 3,498,650 | 3/1970 | Strange | 403/377 X |
| 3,627,363 | 12/1971 | Van Buren, Jr. | 403/377 X |
| 3,635,512 | 1/1972 | Hansen | 403/377 X |
| 3,773,137 | 11/1973 | Escudero | 74/493 |
| 3,994,608 | 11/1976 | Swiderski et al. | 403/377 X |
| 4,911,034 | 3/1990 | Kulczyk et al. | 403/377 X |

*Primary Examiner*—Terry Lee Melius
*Assistant Examiner*—David E. Bochna
*Attorney, Agent, or Firm*—Jimmy L. Funke

[57] ABSTRACT

A damage resistant control, including: a first shaft; a second shaft having its proximal end attached to control apparatus; and adapter apparatus connecting the distal end of the first shaft and the distal end of the second shaft such as to permit a degree of axial movement between the first shaft and the second shaft so as to isolate axial force applied to the first shaft from being transmitted to the second shaft.

7 Claims, 2 Drawing Sheets

DAMAGE RESISTANT CONTROL KNOB/SHAFT ASSEMBLY

BACKGROUND OF THE INVENTION

1. Field of the Invention

The present invention relates to knob-operated controls generally and, more particularly, but not by way of limitation, to a novel damage resistant control knob/shaft assembly.

2. Background Art

Control knobs are used in a variety of applications, a notable one being in vehicle dashboards, for example, where a number of slide and/or rotary controls may be provided. In such controls, typically, a knob is attached to the proximal end of a shaft, with the knob external to the dashboard, and with the shaft extending into the dashboard and having its distal end operatively attached directly to a control mechanism. A disadvantage of this arrangement is that an axial force applied to the knob and toward the dashboard is transmitted directly to the control mechanism which tends to damage both the shaft and the control mechanism. A further disadvantage of such arrangement is that the knob/shaft assembly is prone to rattle.

There are two conventional methods of attaching such a knob to a shaft. The first method is to arrange the knob to frictionally engage the proximal end of the shaft. This arrangement is advantageous in that the knob can be removed relatively easily for servicing of the control mechanism of which it is a part. However, it has been found that, over a period of time, the knob tends to work loose and fall off. The second method is to glue the knob to the distal end of the shaft. With a suitable adhesive, the knob will not fall off. However, a disadvantage of this arrangement is that a non-serviceable part is created which complicates servicing of the control mechanism.

Accordingly, it is a principal object of the present invention to provide a damage resistant control knob/shaft assembly with which an axial force applied to the knob will not tend to damage the control mechanism of which it is a part.

It is another object of the invention to provide such a damage resistant control knob/shaft with which the knob will not tend to fall off the proximal end of the shaft.

It is an additional object of the invention to provide such a damage resistant control knob/shaft assembly that can be easily and economically manufactured and assembled.

Another object of the invention is to provide such a damage resistant control knob/shaft that substantially eliminates rattle.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a damage resistant control, comprising: a first shaft; a second shaft having its proximal end attached to control means; and adapter means connecting the distal end of said first shaft and the distal end of said second shaft such as to permit a degree of axial movement between said first shaft and said second shaft so as to isolate axial force applied to said first shaft from being transmitted to said second shaft.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
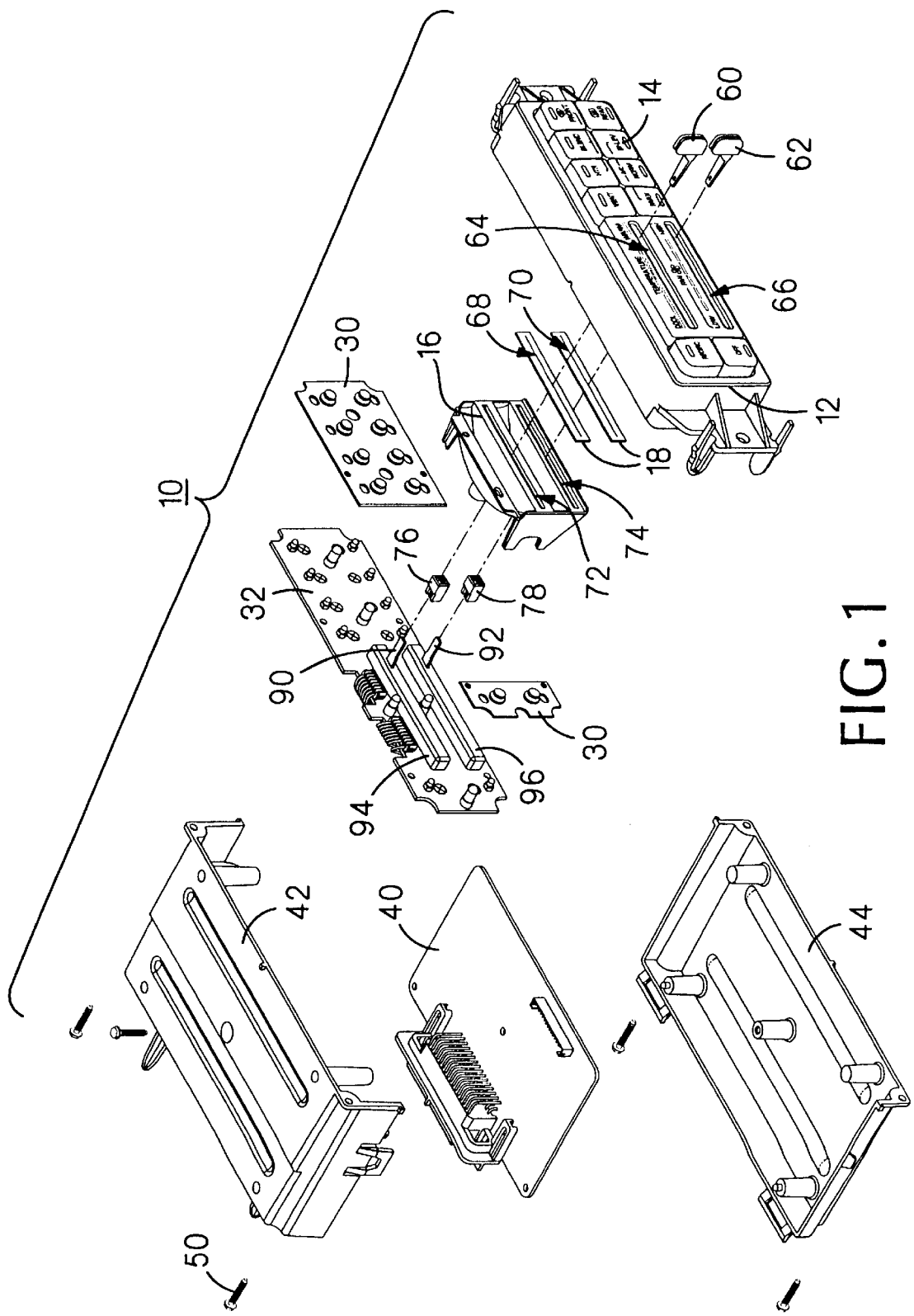
FIG. 1 is an exploded isometric view of a slide control mechanism for use in a vehicle, the control mechanism employing the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates an environmental control mechanism for use in a vehicle, the mechanism being generally indicated by the reference numeral 10. It may be assumed that mechanism 10 is for environmental control in the vehicle and is to be mounted in the dashboard (not shown) of the vehicle.

Mechanism 10 includes a front housing 12 having mounted thereon a plurality of pushbuttons, as at 14. A lightbox 16 is disposed behind front housing 12 and light gaskets 18 are disposed between the front housing and the lightbox. A split switchpad 30 is disposed immediately behind pushbuttons 14 and engages corresponding switch mechanisms on a switch circuit board assembly 32. Switch circuit board assembly 32 is in electrical engagement with a main circuit board assembly 40 and an upper case member 42 and a lower case member 44 are provided to house the foregoing elements, with front housing 12 providing the front cover for mechanism 10. A plurality of suitable fasteners, as at 50, are provided to secure the elements together. As thus far described, the elements of mechanism 10 are conventional.

Mechanism 10 includes upper and lower one-piece control knobs/knob shafts 60 and 62, with the knob shafts extending when the mechanism is assembled, respectively, through slots 64 and 66 defined through front housing 12, through slots 68 and 70 defined through light gaskets 18, through slots 72 and 74 defined through lightbox 16 and into first ends of adapters 76 and 78. Inserted, respectively, in the second ends of adapters 76 and 78 are the distal ends of control shafts 90 and 92 which shafts are movable, respectively, back and forth along the lengths of elongated control bodies 94 and 96 mounted on switch circuit board 32.

While it is not pertinent to the present invention, it will be noticed that mechanism 10 is of the type that provides environmental control for a vehicle, with front housing 12 protruding through the dashboard (not shown) of the vehicle, and with control knobs/knob shafts 60 and 62 being part of the mechanism for controlling rate and temperature of air flow.

Figure 2:
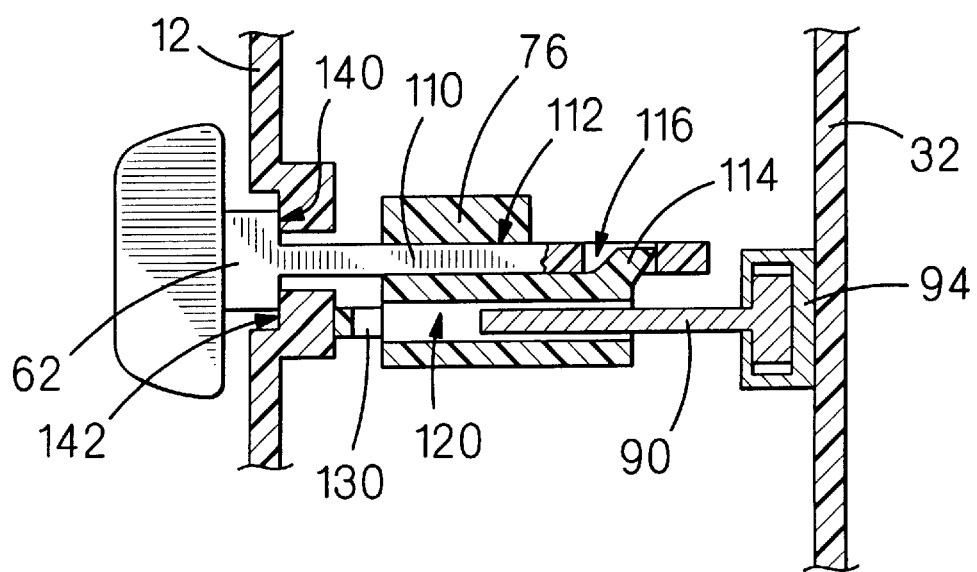
FIG. 2 is a fragmentary, side elevational view, partially in cross-section, of a control knob/shaft assembly constructed according to the present invention and applied to a slide control mechanism of FIG. 1.

FIG. 2 illustrates control knob/knob shaft 62 mounted in front housing 12 (FIG. 1) which may be assumed to be a part of a dashboard of a vehicle (neither shown). The distal end of shaft portion 110 of control knob/knob shaft 62 is inserted through a first channel 112 defined in adapter 76, with a boss 114 formed on the adapter engaging an opening 116 defined in the shaft portion to prevent the shaft portion from being axially withdrawn from the adapter.

The distal end of control shaft 90 is inserted into a second channel 120 defined in adapter 76 and is axially moveable with respect thereto. The proximal end of control shaft 90 terminates within control body 94 which is mounted on switch board assembly 32 (FIG. 1). U-shaped spring 130 formed integrally with adapter 76 biases the adapter apart from front housing 12, with the biasing being resisted by the engagement of an inner face 140 of control knob/knob shaft 62 with the outer face 142 of a depressed portion of front housing 12.

It will be understood that, in a conventional manner, selective movement of control knob/knob shaft 62 back and forth (FIG. 1) will vary the electrical output from control body 94 to vary, for example, the temperature of air flow in the vehicle in which mechanism 10 is mounted.

FIG. 2 illustrates two features of the present invention which essentially eliminate damage caused by an axial force applied inwardly on control knob/knob shaft 62. One is the engagement of surfaces 140 and 142 which engagement initially opposes the force. The second, should front housing 12 flex as a result of the force, is the movement to a degree of the distal end of control shaft 90 within second channel 120 in adapter 76. These two features prevent any but an extremely destructive axial force applied to control knob/knob shaft 62 toward front panel 12 from being transmitted to control body 94 or to switch circuit board 32.

FIG. 2 also illustrates the rattle eliminating feature of the present invention, that being the provision of spring 130 between adapter 76 and the inner face of front housing 12. Spring 130 biases together faces 140 and 142 and also applies axial force against adapter 76 which forces boss 114 against opening 116, thus pressing together the foregoing elements.

The elements of the present invention can be economically manufactured of suitable metals or plastic materials by known processes. Assembly of the arrangement shown on FIG. 2 can be accomplished in a fixture (not shown) constructed for that purpose. First, control knob/knob shaft 62 is placed in the fixture. Then, front housing 12 is loaded into the fixture. Next, adapter 76 is pushed on, with boss 114 and opening 116 snapping together. Finally, preassembled control shaft 90, control body 94, and switch circuit board 32 are installed, with the proper distance between front housing 12 and the switch circuit board being held constant by the structural elements of mechanism 10.

While the control knob assembly of the present invention has been described, for illustrative purposes, as being part of a slide control mechanism, it will be understood by those skilled in the art that the present invention is applicable as well to rotary controls.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. A damage resistant control, comprising:
   (a) a first shaft having proximal and distal ends;
   (b) a second shaft, having proximal and distal ends, and having said proximal end attached to control means;
   (c) adapter means connecting said distal end of said first shaft and said distal end of said second shaft such as to permit a degree of axial movement between said first shaft and said second shaft so as to isolate axial force applied to said first shaft from being transmitted to said second shaft;
   (d) a first channel defined in said adapter into which said first channel said distal end of said first shaft is inserted;
   (e) a second channel defined in said adapter channel, into which said second channel said distal end of said second shaft is inserted;
   (f) a panel through which said proximal end of said first shaft extends;
   (g) knob means attached to said proximal end of said first shaft; and
   (h) biasing means to bias together a surface of said knob means and an outer surface of said panel so as to minimize axial force applied to said knob means toward said panel from being transmitted to said first shaft.

2. A damage resistant control, as defined in claim 1, wherein: said adapter means includes engagement means to prevent said distal end of said first shaft from being removed axially from said adapter means.

3. A damage resistant control, as defined in claim 1, wherein: said first shaft and said knob means are of one-piece construction.

4. A damage resistant control, as defined in claim 1, wherein: said biasing means comprises a spring disposed between said adapter means and an inner surface of said panel.

5. A damage resistant control, as defined in claim 1, wherein: said biasing means and said adapter means are of one-piece construction.

6. A damage resistant control, as defined in claim 1, wherein: said control is a slide control.

7. A damage resistant control, as defined in claim 1, wherein:
   said first channel and said second channel are generally parallel.

* * * * *